United States Patent [19]
Tyren et al.

[11] Patent Number: 5,551,158
[45] Date of Patent: Sep. 3, 1996

[54] METHOD FOR MEASURING POSITION AND ANGLE

[75] Inventors: Carl Tyren, Antibes, France; Leif A. Persson, Staffanstorp, Sweden

[73] Assignee: RSO Corporation N.V., Netherlands

[21] Appl. No.: 256,490

[22] PCT Filed: Jan. 20, 1993

[86] PCT No.: PCT/SE93/00037

§ 371 Date: Sep. 6, 1994

§ 102(e) Date: Sep. 6, 1994

[87] PCT Pub. No.: WO93/14370

PCT Pub. Date: Jul. 22, 1993

[30] Foreign Application Priority Data

Jan. 20, 1992 [SE] Sweden .................. 9200145
Nov. 2, 1992 [SE] Sweden .................. 9203258

[51] Int. Cl.⁶ ............................. G01B 13/24
[52] U.S. Cl. ........................... 33/1 N; 340/551
[58] Field of Search ................. 33/1 N, 355 R, 33/361, 362, 201; 340/551, 572

[56] References Cited

U.S. PATENT DOCUMENTS

| | | |
|---|---|---|
| 4,071,818 | 1/1978 | Krisst . |
| 4,168,496 | 9/1979 | Lichtblau . |
| 4,388,524 | 6/1983 | Walton . |
| 4,399,437 | 8/1983 | Falck et al. . |
| 4,459,474 | 7/1984 | Walton . |
| 4,495,496 | 1/1985 | Miller, III . |
| 4,510,490 | 4/1985 | Anderson, III et al. . |
| 4,584,577 | 4/1986 | Temple ................... 33/1 N |
| 4,600,829 | 7/1986 | Walton . |
| 4,647,917 | 3/1987 | Anderson, III et al. . |
| 4,656,463 | 4/1987 | Anders et al. . |
| 4,727,360 | 2/1988 | Ferguson et al. . |
| 4,940,966 | 7/1990 | Pettigrew et al. .......... 340/551 |
| 4,980,670 | 12/1990 | Humphrey et al. ......... 340/551 |
| 5,001,458 | 3/1991 | Tyren et al. ............... 340/551 |
| 5,099,225 | 3/1992 | Narlow et al. . |
| 5,111,186 | 5/1992 | Narlow et al. . |
| 5,406,262 | 4/1995 | Herman et al. . |

FOREIGN PATENT DOCUMENTS

| | | |
|---|---|---|
| 0338696A2 | 10/1989 | European Pat. Off. . |
| 0366335A2 | 5/1990 | European Pat. Off. . |
| 88/01427 | 2/1988 | WIPO . |
| 89/01722 | 2/1989 | WIPO . |
| 91/00494 | 1/1991 | WIPO . |
| 91/17515 | 11/1991 | WIPO . |

*Primary Examiner*—William A. Cuchlinski, Jr.
*Assistant Examiner*—G. Bradley Bennett
*Attorney, Agent, or Firm*—Merchant, Gould, Smith, Edell, Welter & Schmidt

[57] ABSTRACT

Method for position measurement, whereby a magnetic field is generated in a measuring volume comprising one or several elongated elements of amorphous material, the magnetic properties of which being influenced by the magnetic field, is arranged in the measuring volume. The measuring volume is composed of several sub-volumes, and the extension of the sub-volumes in the desired measuring direction is chosen in such a way that the extension corresponds to the desired measuring resolution in the measuring directions. The change in magnetic or mechanical properties of the element caused by the magnetic flux intensity in the respective sub-volume along the longitudinal direction of the element is detected, the change being a measure of the position of the element.

9 Claims, 4 Drawing Sheets

METHOD FOR MEASURING POSITION AND ANGLE

BACKGROUND OF THE INVENTION

Method and device for measuring position and angle with variable accuracy.

When measuring the position a measuring body or an angular alignment of the measuring body in relation to a reference axis it is of advantage if the measuring body can move freely in a measuring volume, i.e. without bearing on a measuring path or the like. It would also be of advantage if the sensing of the measuring body could take place without contact.

SUMMARY OF THE INVENTION

One object of the present invention is to achieve a method and a device which makes such a measurement possible. Furthermore, according to a further development of the invention a procedure has been achieved which makes a dynamically adjustable accuracy of measurement possible in a given measurement volume.

The measurement procedure according to the present invention is based on certain magnetic and mechanical properties of element in the shape of bands, threads or strips of a material which is amorphously changed when the elements are exposed to a magnetic field, what is called a bias field. For example the position/direction of the element is related to the magnetic field in the longitudinal or axial direction of the amorphous element, thereby making the mechanical resonance frequency of the element a measure of the position/direction of the element. The same procedure is adaptable for a measuring component comprising an amorphous element which is magnetically connected to an inductive element which in turn is a part of an electric resonance circuit. When the magnetic field is changed, the magnetic properties of the amorphous elements are changed so that the inductance of the inductive element is changed. Thereby the resonance frequency of the electric resonance circuit is also changed.

Other materials than amorphous materials are also applicable according to the invention. The crucial property of the material is its characteristics, e.g. magnetic or elastic properties, are influenced by magnetic fields. The influence should be of such an extent that the change in properties can be measurable by remote detection. Examples are materials which are magnetoresistive, the electric conductivity of which are changed in dependence of the magnetic field, and magnetooptical, the light conducting property of which are changed in dependence of applied magnetic field. For materials of the latter type that phenomonen which is called the Faraday-effect can be used, i.e. the plane of oscillation for polarized light is rotated, the deflection angle being proportional to the magnetized field strength, or the phenomonen which is called the Kerrer-effect, whereby a similar effect of certain materials is achieved by the influence of an electric field.

The resonance frequency of an amorphous element exhibiting a comparatively great magneto-mechanical coupling is varied with the intensity of the magnetic flow along the main direction of the element by what is called the delta-E-effect. Thus, if this intensity of magnetic flow is changed as a function of the position/direction of the amorphous element the resonance frequency of the amorphous element will be a function of its position/direction. It is very advantageous to give the measuring information in form of a frequency value since such a value is very immune to noise. Furthermore, mixed information from several measurement transmitters operating on different frequency bands can be transmitted together on one information channel.

In order to achieve an enhanced position of measurement procedures can be used where several amorphous elements are placed in a measuring body. In these instances it is also suitable to register difference and sum frequencies. By utilizing such differential measurement procedures sources of errors can be eliminated, such as for example distortion of the system caused by temperature, properties of the material, changes in the field, etc.

It should be noted that the effective magnetic field along the axial direction of the amorphous element is not necessarily equal to the projection of the total field vector along the amorphous element. By the flux conductive property and geometry of the amorphous element this relationship can deviate from a pure projection. However, the relationship can always be mapped and thereby still permit a base for position/angular measurement.

BRIEF DESCRIPTION OF THE DRAWINGS

The invention will now be further described with reference to the embodiments shown in the accompanying drawings, wherein FIG. 1 schematically shows field lines of a magnetic field while practicizing a measuring procedure according to the invention, FIG. 2 schematically shows field lines of a magnetic field while practicizing an alternative measuring procedure according to the invention, FIG. 3 schematically shows field lines of a magnetic field while practicizing another alternative measuring procedure according to the invention, FIG. 4 schematically shows a practical embodiment of a measuring device according to the invention for measuring the position of a measuring body, FIG. 5 schematically shows an alternative practical embodiment of a measuring device according to the invention for measuring the position of a measuring body, FIG. 6 schematically shows a practical embodiment of a measuring device according to the invention for measuring the angular alignment of a measuring body, FIG. 7 schematically shows an alternative practical embodiment of a measuring device according to the invention for measuring the angular alignment of a measuring body, FIGS. 8A and 8B schematically shows a further development of a measuring device according to the invention for measuring the position of a measuring body and FIG. 9 schematically shows an embodiment of the invention for determining the position and orientation of a measuring body in three dimensions.

DETAILED DESCRIPTION OF THE PREFERRED EMBODIMENTS

Figure 1:
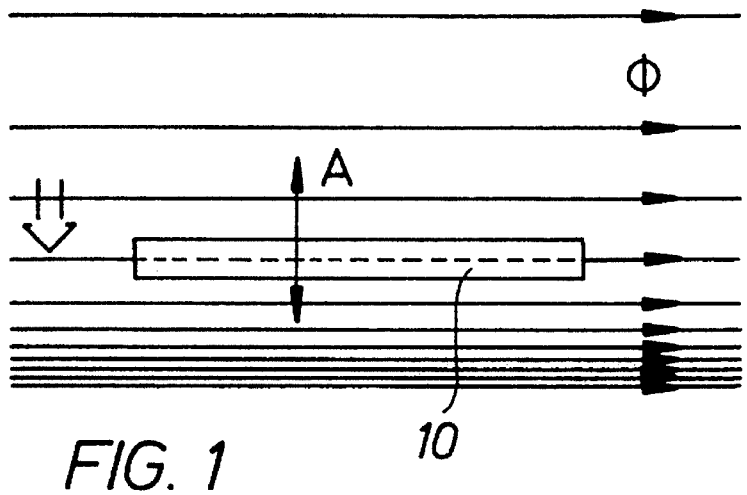

FIG. 1 schematically shows the function when measuring the position according to one embodiment of the invention. An element 10 of amorphous material is placed with its longitudinal direction parallel to the field lines of a magnetic field Φ which is generated in a measuring volume. The increasing density of field lines in FIG. 1 indicates that a field gradient is present within the magnetic field. The field gradient is aligned perpendicular to the field direction. By placing the element 10 within a measuring body which is movable in the direction of the the field gradient the element 10 will be subjected to a magnetizing field strength H of different magnitude in dependence of the position of the element. As already has been described in the beginning of the description a change in strength of the magnetic field working in the longitudinal direction of the element 10 results in a change in the magnetic properties of the element. These are detectable, either by the change of the mechanical resonance frequency of the element and thus the change of the magnetic field around the element or by the element being coupled to an inductive element which is a part of an electric resonance circuit, the resonance frequency of which is changed when the magnetic properties of the element 10 is changed.

Figure 2:
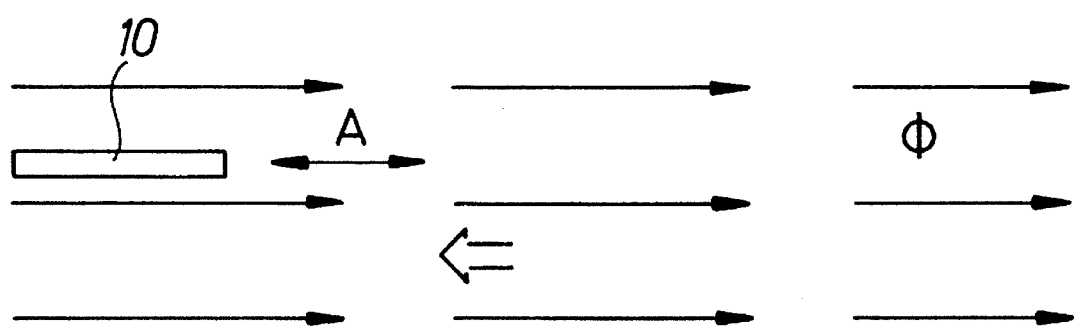

In the embodiment according to FIG. 2 a magnetic field has been generated with a field gradient directed leftwards in the figure. This is evident from the longer lines of force in the left part of the figure. Here the element 10 is movable parallel to the field gradient in the direction of the arrow A.

Figure 3:
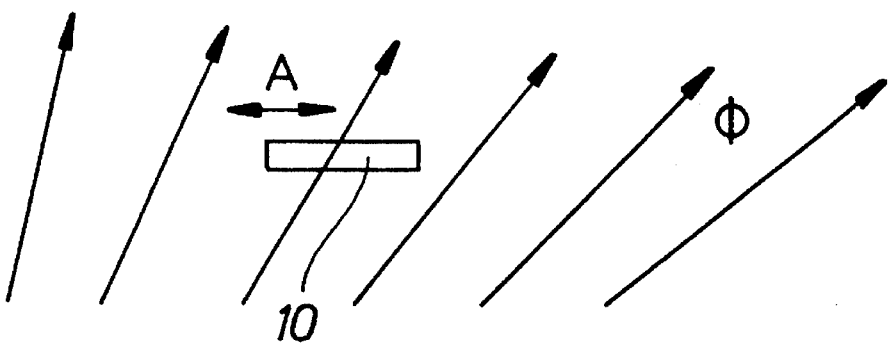

Another embodiment with a magnetic bias field is shown in FIG. 3. In this embodiment the magnetic field has a constant intensity along the measuring distance but the field direction is changed, thus exposing the element 10 in its longitudinal direction for magnetic fields of different magnitudes in dependence of its position. In this embodiment, according to FIG. 3, the element moves horizontally in the direction of the arrow A.

Figure 4:
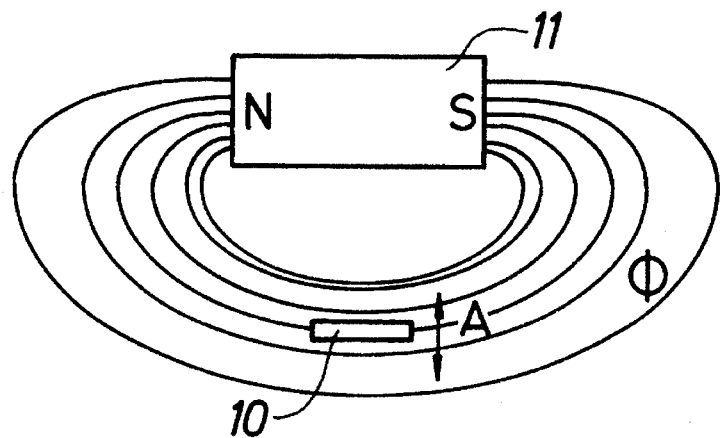

FIG. 4 shows in a simplified form how a magnetic field according to FIG. 1 can be achieved. A magnet 11, which can be a permanent magnet or an electromagnet, generates a magnetic field which is indicated by the curved field lines from the north pole to the south pole of the magnet. If the magnetized field strength along the direction of a motion of the element 10 is completely known the magnetic properties of the element 10 are in every point along the direction of the motion directly related to the position of the element. It is also possible by a calibration procedure to obtain an indication of the magnetic properties in every point, whereby this indication later on can be used reversely for the determination of the position of the element.

Figure 5:
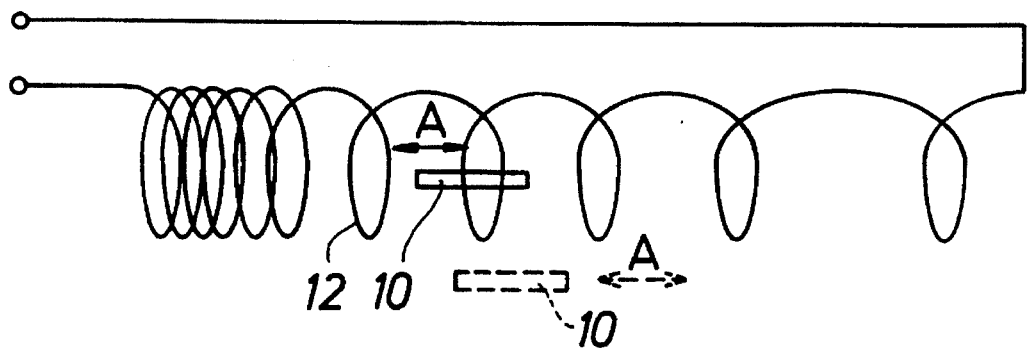

FIG. 5 shows a simplified embodiment for obtaining a measurement according to FIG. 4. A coil 12 with varying pitch ratio is arranged with its extension length in the direction of motion of the element 10. The element 10 is movable, either inside the coil or outside in a direction which is parallel to the center axis of the coil. As to the rest, the measuring procedure according to FIG. 5 corresponds with the procedure described in FIG. 4.

Figure 6:
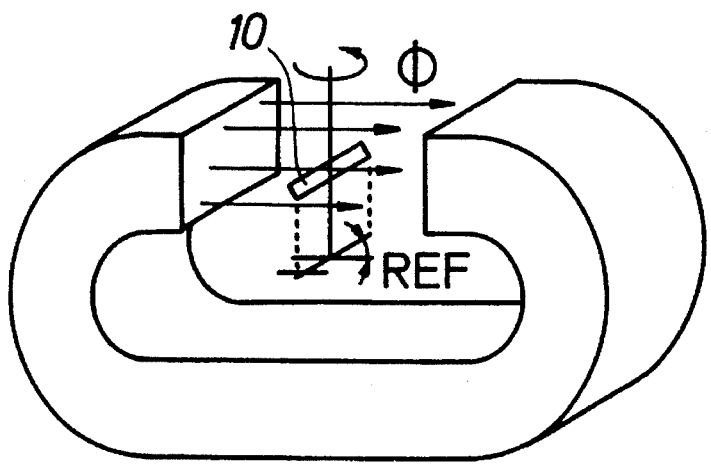

FIG. 6 shows schematically an embodiment for angular measurement according to the invention. A magnetic field Φ is generated by a magnet 11 which can be a permanent magnet or an electromagnet. The field lines from the magnetic field are substantially parallel in one plane and the element is arranged rotatable in this plane. The vital and detectable magnetic properties of the element 10 is thereby directly related to the angular alignment of the element 10 in comparision with a reference direction (REF). Measurements according to this embodiment results in angular alignments within the interval 0°–90°.

By arranging two elements 10 of different lengths fixed with a certain angular displacement in relation to each other measurements within the interval 0°–180° are possible.

Nor is it necessary that the field lines are quite parallel. If the field picture is known in that plane which the element, or elements, are moving, or if the calibration procedure described above is used, angular measurements can nevertheless be performed.

Alternatively, the magnetic field can be rotated/thrown over between different known directions, thereby eliminating ambiguities in detection.

A further embodiment for angular measurement utilizes three orthogonal, known magnetic fields. Thereby it is possible to determine the direction of an amorphous element in three dimensions (azimuth and elevation).

It is also possible by a calibration procedure to determine the relationship between the orientation of the amorphous element and its resonance frequency. If this is accomplished with an arbitrary magnetic field which varies with the rotation angle/angles a complete angular determination is possible.

A further alternative embodiment is as follows. When passing the resonance frequency of the amorphous element with an exciting signal frequency a marked phase shift takes place between the excited and detected (amorphous) signal.

An alternative procedure for measuring position/angle can thus be to excite with a fixed frequency and instead measuring the phase level between excitation and detection when the position of the amorphous element is varied around that position/orientation in a chosen bias which gives a resonance that is equal to the chosen, fixed exciting frequency. Again, a possibility can be seen for a high performance measurement around an arbitrary chosen (with the combination of biased and fixed frequency) point along the measuring interval.

Figure 7:
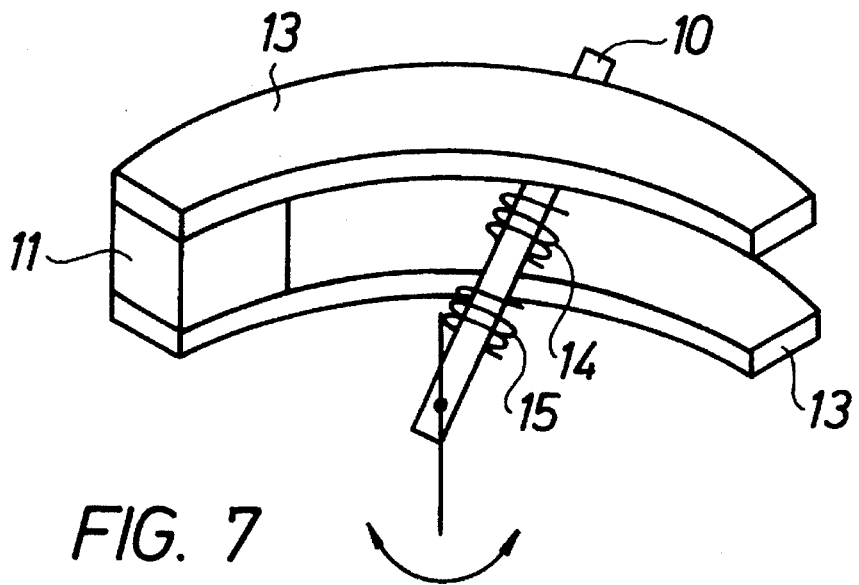

A further embodiment for angular measurement is evident from FIG. 7. A coil 11 generates a magnetic field which is directed through two flow conduits formed as shanks 13, between which a magnetic field in that way is directed. The shanks 13 are flat, substantially parallel plates which are bent in one plane. The shanks are also somewhat tapered towards their free ends. An element 10 is pivotally arranged in the area of the central point of the radius after which the shanks are curved. The element 10 extends inbetween the shanks. The measuring coil 14 is arranged around the element 10 in that area of the element which is positioned between the shanks 13. A second measuring coil 15, however anti-phase winded, is arranged in series with the coil 14, the measuring coil being positioned outside the magnetic field between the shanks 13 during the total rotating movement of the element 10. By this embodiment different types of disturbances from external sources generating a magnetic field which otherwise would influence the angular measurement negatively are eliminated.

Figure 8A:
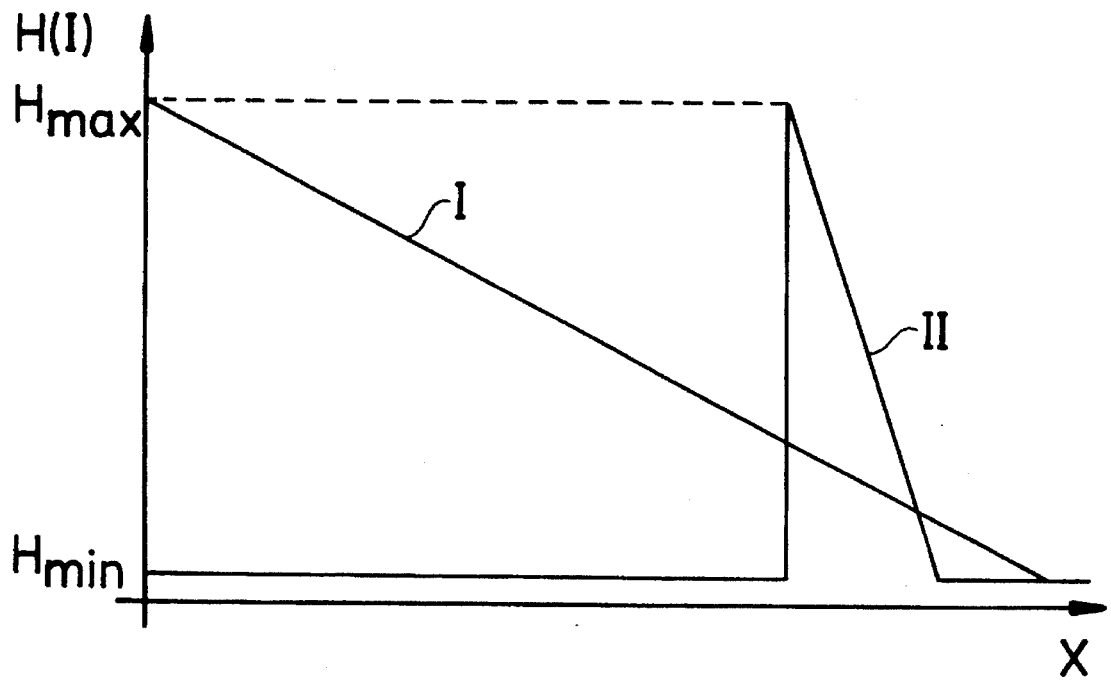
Figure 8B:
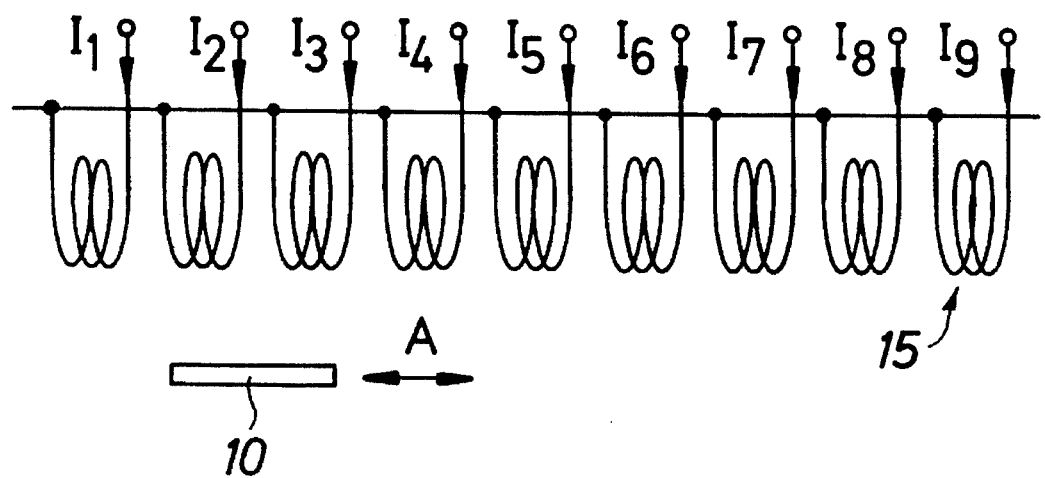

In FIGS. 8A and 8B an embodiment of measurement according to the invention is shown, according to which the measurement accuracy can be adjusted dynamically over a measuring area or a measuring volume. An amorphous element has a maximal working area, within which its magnetic properties are changed in a known way in relation to the magnetizing field strength H. As shown in FIGS. 8A and 8B applicable measuring area is thus limited by a maximum and a minimum value of the magnetizing field strength H ($H_{max}$ and $H_{min}$, respectively). In a first stage of the measurement the distance between $H_{max}$ and $H_{min}$ is utilized over the total measuring area, which is marked by the line I in FIGS. 8A and 8B. As shown in FIG. 8B, the magnetizing field strength H can be achieved by leading an electric current with continuously increasing strength into the coil system 15 which is arranged at the measuring distance. In the embodiment shown in FIGS. 8A and 8B the current $I_1$ is greater than the current $I_9$. When moving the element 10 in the direction of the arrow A, the position of the element is detected as a function of the actual magnetic properties of the element, for example its resonance frequency. In order to increase the accuracy of measurement in a shorter interval of the measuring distance, the current is increased through some of the coils present in the coil system 15 so as to attain a magnetizing field strength H according to the curve II. The total working area of the element 10 will then lie within a very narrow interval of length and a very accurate measurement of the position is thus possible. The magnetizing field strength H with its desired distribution can also be achieved in other ways. Several coils arranged together in different geometries can for example be made to generate the field strength by driving currents of different magnitudes through the different coils.

Figure 9:
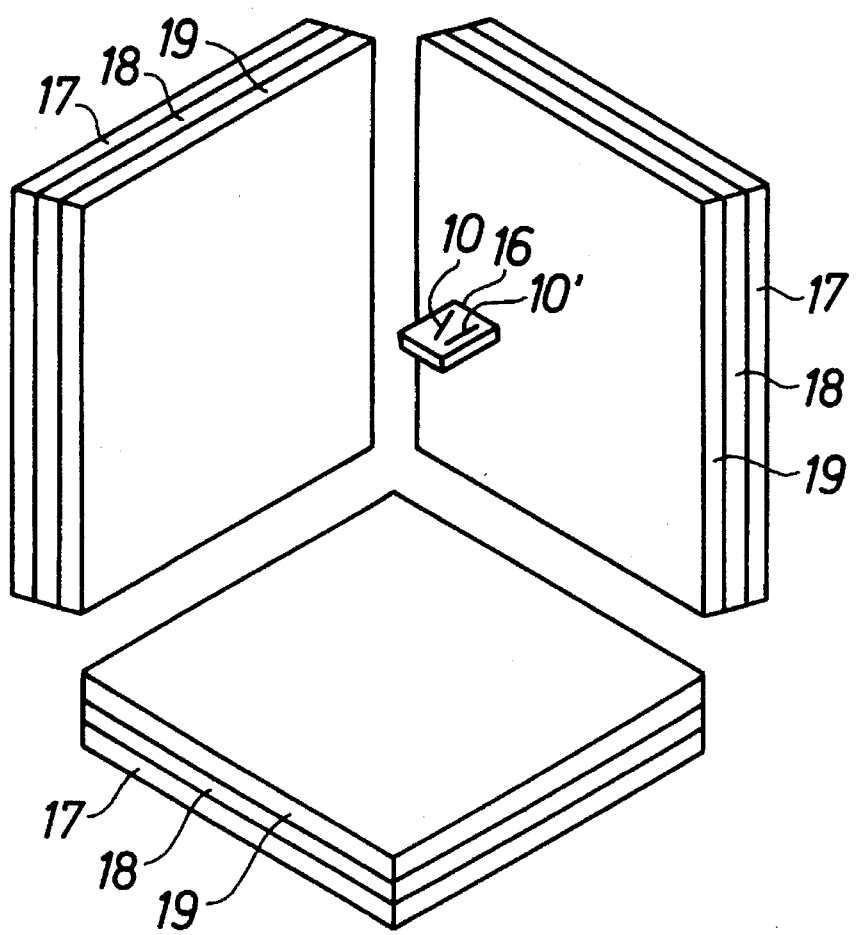

In most cases the embodiments described above refer to a one- or two-dimensional measurement, but it is also quite possible to achieve the measurement in three dimensions by combining several coil systems. If a measuring object is provided with two elements of different magnetic properties, e.g. of different length, the elements being so arranged that they are angularly displaced from each other or parallelly displaced in their transverse direction, the position of the object as well as its orientation can be determined. This is evident from FIG. 9 which shows three orthogonally arranged coil systems. A measuring body 16 is arranged in that volume which on three sides is delimited by a coil system. Two elements 10 and 10' are arranged on the measuring body, the elements being rotated with a certain angle in relation to each other. Each coil system comprises a coil 17 for generating a magnetic bias field, a coil 18 for generating an exciting signal, and a coil 19 for detection of the signal from the elements 10, 10'. In an alternative embodiment, according to which the amorphous element is a part of an electric resonance circuit, the coil 19 is replaced by an antenna.

One alternative procedure for increasing the resolution within a small interval of length is based on the resonance frequency of an element 10 undergoing a drastic phase shift in relation to an exciting signal. In this procedure the signal in form of a sweep frequency is generated to excite the element 10. When the sweep frequency passes the resonance frequency of the element the latter is brought into self-oscillation. This corresponds to the normal measuring procedure. Then the exciting signal is locked at the resonance frequency and the phase difference between exciting signal the respond signal generated from the element is detected instead. Since the phase difference varies very strongly around the point of resonance the resolution of detection thus becomes very high.

An amorphous band can be brought to self-oscillation by a magnetic field of a certain signal form and/or frequence being generated in an exciting coil. The signal form is suitably a short pulse but signals of more lasting nature can also be used. The exciting coil can be arranged at some distance from the band and have a working area which covers the total measuring volume. It is also possible to arrange the exciting coil directly adjacent to the band and in such a way that the exciting coil accompanies the movement of the band in the measuring volume.

In order to detect and register the changed properties of an amorphous band in dependence of an external magnetic bias field, what is called a bias-field, e.g. the resonance frequency of the band, it is suitable to arrange a detection coil or a pickup-coil. As for the exciting coil the detection coil can be arranged at a distance from the band and have a working area which covers the total measuring volume. It is also possible to directly arrange the detection coil adjacent to the band and in such a way that the exciting coil accompanies the movement of the band in the measuring volume. Of course, combinations of the coil embodiments mentioned above are also possible.

Since the measuring procedure according to the invention is based on the position of an amorphous element in relation to an external magnetic field it is also possible to have the element fixedly arranged and the magnetic field being movable, rotatable or displaceable.

We claim:

1. Method for position measurement, whereby a magnetic field having a flux intensity is generated in a measuring volume comprising at least one elongated element of amorphous material, the magnetic/mechanical properties of which are influenced by the magnetic field, which is arranged in the measuring volume, providing the magnetic field with a gradient in the measuring volume;

providing the measuring volume with a plurality of sub-volumes;

choosing extension of the sub-volumes in desired measuring directions in such a way that the extension corresponds to a desired measuring resolution in the measuring directions;

detecting a change in the magnetic/mechanical properties of the element caused by the magnetic flux intensity in a respective sub-volume along a longitudinal direction of the element, the change being a measure of a position of the element; and the position measurement comprising the steps of: measuring a gradient adapted to a total length of a total measuring area and magnetic working area of the element; and measuring a gradient adapted to a sub-distance of a length of the total measuring area of the element.

2. Method as in claim 1, further comprising a step of providing the magnetic field with a known strength and direction in the longitudinal direction of the element in each sub-volume.

3. Method as in claim 1, further comprising a step of bringing a plurality of elements of said at least one element to self-oscillation mechanically; and detecting a resonance frequency of the plurality of elements as a position-determined measuring signal.

4. Method as in claim 1, further comprising a step of connecting the element magnetically to an inductive element in an electric resonance circuit.

5. Method as in claim 1, further comprising a step of bringing the gradient to adopt a known value in the measuring directions.

6. Method as in claim 5, further comprising a step of bringing the magnetic field to adopt a greater steepness concerning gradient in chosen regions of the measuring volume.

7. Method as in claim 1, further comprising the steps of: generating the magnetic field in a uniform field direction in the measuring volume and with the field gradient perpendicular to field direction; and provide the amorphous element with its longitudinal direction parallel to the field direction of the magnetic field, the measuring direction being parallel to the field gradient.

8. Method as in claim 1, further comprising the steps of: generating the magnetic field with a uniform field direction and with a field gradient parallel to the field direction; and arranging the amorphous element with its longitudinal direction parallel to the field direction of the magnetic field, the measuring direction being parallel to the field gradient.

9. Method as in claim 3, further comprising the steps of: bringing the amorphous element to self-oscillation by an exciting signal of variable frequency, a certain phase shift arising between the exciting signal and a signal transmitted by the amorphous element;

locking the exciting signal at the resonance frequency; and detecting a phase shift between the exciting signal and the signal transmitted by the amorphous element as a signal dependent on the position of the amorphous element.

* * * * *

UNITED STATES PATENT AND TRADEMARK OFFICE
CERTIFICATE OF CORRECTION

PATENT NO. : 5,551,158
DATED : September 3, 1996
INVENTOR(S) : Tyren et al.

It is certified that error appears in the above-identified patent and that said Letters Patent is hereby corrected as shown below:

ON THE TITLE PAGE:

Item [30], Foreign Data: "9200145" should read --9200145-2--

[30], Foreign Data: "9203258" should read --9203258-0--

Col. 4, lines 57-58: "FIGS. 8A and 8B" should read --FIG. 8A the--

Col. 4, line 63: "FIGS. 8A and 8B" should read --FIG. 8A--

Col. 4, line 67: "FIGS. 8A and 8B" should read --FIG. 8B--

Col. 7, line 2: insert --a-- after the word "to"

Signed and Sealed this

Twenty-fifth Day of November, 1997

Attest:

BRUCE LEHMAN

*Attesting Officer*  *Commissioner of Patents and Trademarks*